(12) United States Patent
East et al.

(10) Patent No.: US 6,185,569 B1
(45) Date of Patent: Feb. 6, 2001

(54) LINKED DATA STRUCTURE INTEGRITY VERIFICATION SYSTEM WHICH VERIFIES ACTUAL NODE INFORMATION WITH EXPECTED NODE INFORMATION STORED IN A TABLE

(75) Inventors: Jeffrey A. East, Issaquah, WA (US); Albert L. Lingelbach, New York, NY (US); Steven J. Lindell; Goetz Graefe, both of Bellevue, WA (US); Craig G. Zastera, Woodinville, WA (US); Sameet H. Agarwal, Redmond, WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/106,727

(22) Filed: Jun. 29, 1998

(51) Int. Cl.$^7$ .................................................. G06F 17/30
(52) U.S. Cl. ..................... 707/101; 707/100; 711/217; 711/218
(58) Field of Search ................................. 707/100, 101; 711/217, 218, 141, 153

(56) References Cited

U.S. PATENT DOCUMENTS

| | | | |
|---|---|---|---|
| 5,559,979 | * 9/1996 | Shiga et al. | 711/218 |
| 6,035,326 | * 3/2000 | Miles et al. | 709/206 |
| 6,049,802 | * 4/2000 | Waggener, Jr. et al. | 707/100 |
| 6,067,547 | * 5/2000 | Douceur | 707/100 |

\* cited by examiner

Primary Examiner—Thomas G. Black
Assistant Examiner—William Trinh
(74) Attorney, Agent, or Firm—Woodcock Washburn Kurtz Mackiewicz & Norris LLP

(57) ABSTRACT

A linked data structure verification system to verify the integrity of at least one linked data structure simultaneously by way of a verification setup phase and an integrity verification phase. Individual nodes are retrieved from a memory device and examined seriatim in optimal memory device location order. Nodes are retrieved and examined in optimal memory device location order for maximum memory device retrieval performance. Expected and/or actual node information about nodes in a given linked data structure are temporarily stored as records in an integrity verification table for only as much time as is necessary to verify any part of the node information prior to excising one or more unnecessary records from the integrity verification table.

19 Claims, 7 Drawing Sheets

LINKED DATA STRUCTURE INTEGRITY VERIFICATION SYSTEM WHICH VERIFIES ACTUAL NODE INFORMATION WITH EXPECTED NODE INFORMATION STORED IN A TABLE

FIELD OF THE INVENTION

This invention relates to the field of linked data structures, and in particular to a system for verifying the integrity of administrative data for a variety of linked data structure types including, but not limited to, linked lists, indexed trees, and secondary index trees.

Problem

Linked data structures are logical arrangements of data that facilitate efficient and organized data storage, data manipulation, and data retrieval. The basic component of a linked data structure is known as an element or node. Individual nodes in a linked data structure are linked together by special fields called pointers that identify or "point to" neighboring nodes in a linked structure of nodes. A pointer is also sometimes referred to as reference.

One reason it is important that the pointers in each node of a linked data structure are accurate is because logically neighboring nodes of a linked data structure are not necessarily stored in adjacent physical locations on a memory device. Absent a guarantee of physical proximity from one node to the next on a memory device, it is difficult to know which node is actually the next logical node in a linked data structure if an invalid pointer exists. Thus, a pointer that does not correctly point to a next logical node within the linked data structure renders the entire linked data structure unreliable and unusable.

For these and other reasons, the general problem addressed by the invention disclosed herein is that of how to verify quickly and efficiently the integrity of a linked data structure.

The following text accompanying FIGS. 1–2 are representative examples of typical linked data structures and their general characteristics. The examples are presented for background purposes generally and to clarify terms used in this document specifically. Note that other types of linked data structures exist that are considered within the scope of this document yet have characteristics beyond those illustrated in FIGS. 1–2. Examples of other types of linked data structures include, but are not limited to, tagged structures, secondary index structures, and binary tree structures. Note also that the text accompanying FIGS. 1–2 is intended only to convey basic ideas and terms, and is not intended as a complete discussion of the flexibility and construction of any one or all linked data structures known in the art. The representative linked data structure types illustrated in the text accompanying FIGS. 1–12 include, but are not limited to, linked lists and index trees. Although linked data structure types are not limited to linked lists and index trees, these two linked data structure types are commonly understood structures existing in the art and are presented as a basis for discussion purposes and not as any limitation on the scope or field of use of the disclosed invention.

FIG. 1 illustrates a typical doubly linked list 100 in block diagram form. Doubly linked list 100 and linked lists generally are also known as a heap type structure. Doubly linked list 100 includes nodes 110–113 each stored in a discrete location of a memory device. Generally speaking, each of the respective nodes 110–113 include at least one pointer including a Forward Pointer (FP) 120–123 from any first node to a neighboring second node, and a corresponding Backward Pointer (BP) 130–133 from the second node back to the first node. The purpose of the pointers is to establish a logical chain from one node to the next and back again, so that the list of nodes 110–113 can be traversed in either a forward direction or backward direction.

For example, if the backward pointer 130 of node 110 points to node 113 and the forward pointer 123 of node 113 points to node 110, then the doubly linked list 100 is a continuous loop of chained nodes. However, if the backward pointer 130 of node 110 and the forward pointer 123 of node 113 are both NULL pointers, then the doubly linked list 100 has a special characteristic where there exists only one first node and one last node among a bounded linear chain of nodes 110–113. As illustrated in FIG. 1, node 110 is the first node of the linked list and node 113 is the last node of the linked list.

FIG. 2 illustrates a typical index tree in block diagram form. Index trees are also known as clustered index structures, trees, or in the present case a B-tree 200. Note that a B-tree and a binary tree are distinguishable in the art, and that the present discussion relates to B-trees.

B-tree 200 includes nodes 210–216 each stored in a discrete location of a memory device. Each of the nodes 210–213 are referred to in degrees of consanguinity, at least to the extent of parent, child, and siblings that each descend from a common ancestor called a root or root node. In the present example, the root node is node 210. Nodes 211–213 are siblings of each other as well as children of node 210. Further, nodes 214–216 are siblings of each other as well as children of parent node 212, and so on.

Each generation of the B-tree 200 is referred to as a level. Levels are numbered from the youngest generation, level 0, through the oldest generation, level n. There are three levels in B-tree 200, namely level 2 containing root node 210, level 1 containing nodes 211–213, and the level 0 containing nodes 214–216. Note also that nodes that have no children, such as level 0 nodes 214–216, are also referred to as leaf nodes because a leaf is as far down the branches of a tree as can be traversed.

A variety of pointers exist among the respective nodes 210–216 depending on the location of each node in the linked structure. The variety of pointers in the present example include left child pointers 220–223, right child pointers 230–233, inner child pointers 240–243, and doubly linked list style pointers such as forward pointers 250–255 and corresponding backward pointers 260–265 among the various levels within the linked structure. Note that although the present B-tree 200 example illustrates only three children for any one node, a B-tree can be constructed to have any number of children. Note also that each leaf node 214–216 can also contain any number of data fields other than the illustrated data fields 290–298, and one or more data fields 290–298 may exist that do not contain any data at all.

B-tree 200 is referred to as an index tree structure because each of the nodes 210–216 includes administrative data in an index field. An index field is also known as a key or key field. The purpose of an index field is to facilitate the search for a specific item of substantive data in a leaf node. In the present B-tree 200 example, the administrative data in nodes 210–216 are located in index fields 270–277 and 280–288, and the substantive data in leaf nodes 214–216 are located in data fields 290–298.

For example, consider a B-tree having a discrete piece of substantive data located in respective leaf nodes, and each leaf node is uniquely identified by a letter of the alphabet known as a key or index key. If the substantive data indexed by the letter L is desired, a traverse of B-tree 200 would begin from root node 210. Index field 270 would be examined and found less than letter L, then index field 271 would be examined and found less than letter L, then index field 272 would be examined and found greater than letter L. Thus the child pointer 240 of node 210 to node 212, indicated by index field 271 as the last index field less than the index letter L, would be followed to node 212. Similarly left child pointer 222 of node 212 would be followed to node 214, and again index field L is located along with its accompanying substantive data in data field 292. Because the entire traverse of the B-tree 200 example required visits to only two nodes, an indexed search is a significantly more efficient way to locate data in a linked data structure than a linear search for the same data in a linked list type data structure.

One notable linked data structure storage and indexing scheme that exists in addition to those discussed above, is the secondary index linked data structure. A secondary index linked data structure can use a B-tree 200 as a secondary index search tree to identify a specific leaf node. The specific leaf node of the secondary index search tree does not itself contain the desired data, and instead the leaf node points to some other element of an independent data structure that contains the actual substantive data. Therefore more than one secondary index search tree can point to the same data. In the case of more than one secondary index search tree pointing to the same data, each secondary index keys on a different field of the substantive record.

To recapitulate, the general problem with linked data structures, including but not limited to the linked data structures discussed above, is that if any pointer in a linked data structure becomes corrupted or otherwise invalid so that a pointer does not correctly point to what is intended as the next node or child node, then the integrity of the entire data structure is compromised. A compromised data structure is neither reliable nor usable. Although it is possible to identify an invalid pointer in a small linked data structure having only a few nodes, the task becomes very complex and costly in terms of time and/or computing resources for large linked data structures having hundreds of thousands of nodes, and more difficult still if more than one invalid pointer exists among the nodes. One common example of a pointer inconsistency is where a forward pointer from a first node points to a second node while the backward pointer from the second node points to some other third node. It is immediately apparent that the corresponding forward and backward pointers disagree and that significant additional investigation is required to determine which one of the pointers, or whether both of the pointers, are incorrect.

Existing techniques for verifying the integrity of a linked data structure include a pointer by pointer traversal of the linked data structure in a logical pointer order that follows from one node pointing to the next. However, logical pointer order verification traversals are undesirable because the pointers being used to traverse the linked data structure are the very pointers whose integrity is being verified. Thus, existing verification programs using this technique can be easily misled by an invalid pointer prior to the time the invalid pointer is identified.

Another reason existing logical pointer order verification traversals of a linked data structure are undesirable is because it is difficult to determine what type of pointer data should be cataloged and how much pointer data should be cataloged during a verification traversal. For example, a pointer inconsistency in a node of one branch of an index tree may not be apparent until another node of an entirely different branch of the index tree is investigated. This suggests that there is a need to save pointer data from each node in the index tree until all nodes in the index tree have been verified to be certain that all pointer errors have been properly identified. However, duplicating the entire set of pointer data from each node in a memory location separate from the index tree itself is highly resource intensive and cumbersome, particularly for very large data structures.

Another reason existing logical pointer order verification traversals are undesirable is that a full depth traversal of a linked data structure is extremely time and/or computing resource intensive due to the iterative branch by branch traversal required for index tree structures.

For these reasons, there exists an ongoing need for a fast and highly efficient linked data structure verification system that performs in a manner that maximizes verification accuracy while minimizing elapsed verification time, and minimizing the use of computing resources generally. A system of this type has heretofore not been known prior to the invention as disclosed below.

Solution

The above identified problems are solved and an advancement is achieved in the field of linked data structures due to the linked data structure verification system of the present invention. The linked data structure verification system of the present invention verifies the integrity of a linked data structure in two main phases that include a verification setup phase and an integrity verification phase. The two main phases can operate on more than one linked data structure at substantially the same time.

The verification setup phase operates in real time during the normal course of linked data structure processing as each node in a given linked data structure is added or removed from a linked data structure. Specifically, the verification setup phase maintains a real-time record of the node label and the physical memory location of each node of a linked data structure in a memory device. The real-time record is preferably stored in a portion of a memory that is separate from the linked data structure itself. The memory can be volatile or non-volatile memory.

The integrity verification phase operates on a linked data structure that is ideally in a stable state. Note, however, the verification phase can operate on a linked data structure as changes are occurring to the structure although care must be taken to track and account for any changes that occur after the verification phase begins. The stable state of a linked data structure is one where normal linked data structure operations are temporarily halted so that nodes are not being added or removed during integrity verification. Specifically, the integrity verification phase visits each node of a linked data structure in an optimal memory device access order rather than in a logical pointer by pointer order. For example, an optimal memory device access order for a traditional magnetic disk or optical disk, might be in physical memory location order of cylinder and/or head to minimize the seek time from one node to the next. As each node is encountered during traversal of the linked data structure in optimal memory device access order, pieces of node-defining data are temporarily cataloged in an integrity verification table only as long as is necessary to verify the pointer information for a given node. Once a discrete piece of node-defining data is verified, the data is excised from the integrity verification table. Excising information from the verification table means that the data is either deleted and/or incorporated within the scope of data that remains in the integrity verification table.

The optimal memory device access order for any given memory device is determined by knowledge of the access characteristics of a given memory device on which the linked data structure resides. Once the type of memory device is known, the node information needed for the integrity verification process is organized accordingly in a verification setup table during the verification setup phase.

The linked data structure verification system of the present invention holds several advantages over existing linked data structure verification systems. First, the on-the-fly excising of verification table data minimizes the total amount of memory used by the verification table at any given time. Second, traversing the nodes of a linked data structure in optimal memory device access order minimizes access time of node information because the memory device on which the linked data structure is stored is retrieving data in a manner that facilitates optimal node retrieval performance by the memory device. Optimal memory device access efficiency is most apparent on memory or storage devices where the access time to data on the device is significantly slower than processor access times. One example of such a storage device is a nonsolid state memory device such as a traditional magnetic disk or tape. Third, visiting the nodes of a linked data structure in optimal memory device access order eliminates reliance on node pointers that are used for traditional node traversals, thus eliminating certain validation errors and the resulting chance of wasted time and/or computing resources. Fourth, traversing the nodes of a linked data structure in optimal memory device access order permits the verification program to take advantage of read-ahead type Input/Output (I/O) operations that result in minimizing the time spent waiting for slower memory device I/O operations to complete.

DETAILED DESCRIPTION

Figure 3:
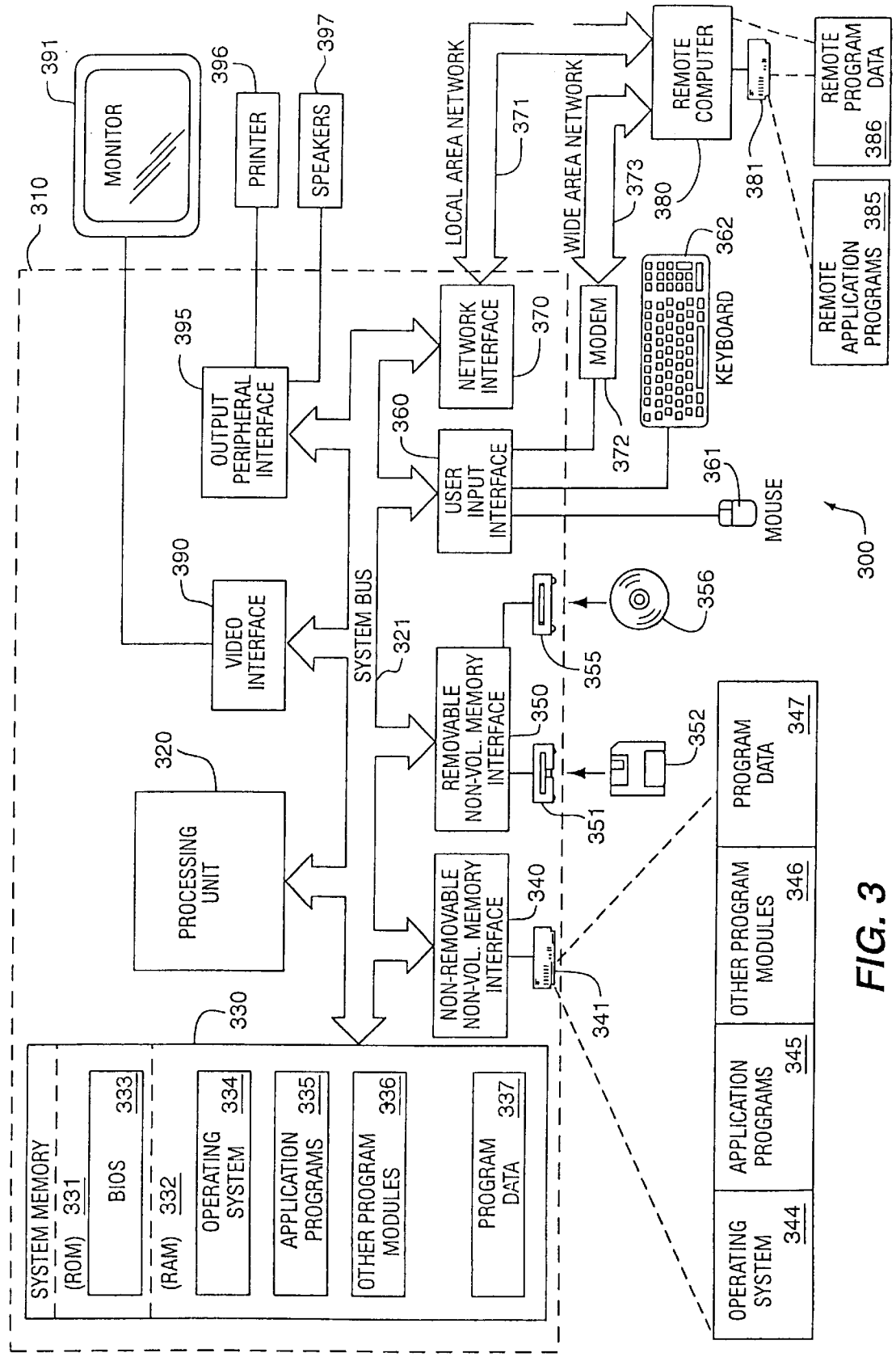
FIG. 3 illustrates an example of a computing system environment in block diagram form on which the claimed invention could be implemented.

Computing System Environment—FIG. 3

FIG. 3 illustrates an example of a computing system environment 300 on which the claimed invention could be implemented. The computing system environment 300 is only one example of a suitable computing environment for the claimed invention and is not intended to suggest any limitation as to the scope of use or functionality of the claimed invention. Neither should the computing environment 300 be interpreted as having any dependency or requirement relating to any one or combination of components illustrated in the exemplary computing system environment 300.

The claimed invention is operational with numerous other general purpose or special purpose computing system environments or configurations. Examples of well known computing systems, environments, and/or configurations that may be suitable for use with the claimed invention can include, but are also not limited to, a general purpose Personal Computer (PC), hand-held or lap top computers, multi-processor systems, microprocessor-based systems, programmable consumer electronics, network computers, Personal Communication Systems (PCS), Personal Digital Assistants (PDA), minicomputers, mainframe computers, distributed computing environments that include any one or more of the above computing systems or devices, and the like.

The claimed invention may also be described in the general context of computer-executable instructions that are executable on a PC. Such executable instructions include the instructions within program modules that are executed on a PC for example. Generally, program modules include, but are not limited to, routines, programs, objects, components, data structures, and the like that perform discrete tasks or implement abstract data types. The claimed invention may also be practiced in distributed computing environments where tasks are performed by remote processing devices that are linked through a communications network. In a distributed computing environment, program modules may be located in both local and remote memory devices.

The exemplary computing system environment 300 is a general purpose computing device such as PC 310. Components of PC 310 include, but are not limited to, a processing unit 320, a system memory 330, and a system bus 321. The system bus 321 communicatively connects the aforementioned components and numerous other cooperatively interactive components.

Processing unit 320 is the primary intelligence and controller for PC 310 and can be any one of many commercially available processors available in the industry. System bus 321 may be any combination of several types of bus structures including, but not limited to, a memory bus, a memory controller bus, a peripheral bus, and/or a local bus. System bus 321, also referred to as an expansion bus or I/O channel, can be based on any one of a variety of bus architectures including, but not limited to, Industry Standard Architecture (ISA) bus, Micro Channel Architecture (MCA), Enhanced ISA (EISA), Video Electronics Standards Association (VESA) local bus, and Peripheral Component Interconnect (PCI) also known as Mezzanine bus.

System memory 330 is a volatile memory that can include a Read Only Memory (ROM) 331 and/or a Random Access Memory (RAM) 332. ROM 331 typically includes a Basic Input/Output System (BIOS) 333. BIOS 333 is comprised of basic routines that control the transfer of data and programs between peripheral non-volatile memories that are accessible to PC 310 during start-up or boot operations. RAM 332 typically contains data and/or programs that are immediately accessible to and/or presently being operated on by processing unit 320. Types of data and/or programs in RAM 332 can include operating system programs 334, application programs 335, other program modules 336, and program data 337.

Other components in PC 310 include numerous peripheral devices that are accessible to processing unit 320 by way of system bus 321. The numerous peripheral devices are supported by appropriate interfaces that can include a first non-volatile memory interface 340 for non-removable non-volatile memory device support, a second non-volatile memory interface 350 for removable non-volatile memory device support, a user input interface 360 for serial device support, a network interface 370 for remote device communication device support, a video interface 390 for video input/output device support, and an output peripheral interface 395 for output device support.

Examples of a non-removable non-volatile memory device can include a magnetic disk device 341 or other large capacity read/write medium such as an optical disk, magnetic tape, optical tape, or solid state memory. Types of data often stored on a non-removable non-volatile memory device include persistent copies of programs and/or data being used and/or manipulated in RAM 332 such as operating system programs 344, application programs 345, other program modules 346, and program data 347.

One example of a removable non-volatile memory device can include a magnetic floppy disk device or hard disk device 351 that accepts removable magnetic media 352. Another example of a removable non-volatile memory device can include an optical disk device 355 that accepts removable optical media 356. Other types of removable media can include, but are not limited to, magnetic tape cassettes, flash memory cards, digital video disks, digital video tape, Bernoulli cartridge, solid state RAM, solid state ROM, and the like.

User input interface 360 supports user input devices that can include, but are not limited to, a pointing device 361 commonly referred to as a mouse or touch pad, and a keyboard 362. Other user input devices can include, but are not limited to, a microphone, joystick, game pad, neurostimulated sensor, and scanner, and may require other interface and bus structures such as a parallel port, game port or a Universal Serial Bus (USB) for example.

User input/output devices supported by video interface 390 can include a display monitor 391 or a video camera. Output peripheral interface 395 supports output devices such as printer 396 and speakers 397.

Network interface 370 supports communications access to a remote computing facility such as remote computer 380 by way of Local Area Network (LAN) 371 and/or Wide Area Network (WAN) 373, or other Intranet or Internet connection. Other remote computing facility types for remote computer 380 can include, but are not limited to, a PC, server, router, printer, network PC, a peer device, or other common network node. A remote computer 380 can typically include many or all of the components described above for PC 310. Modulator/Demodulator (MODEM) 372 can also be used to facilitate communications to remote computer 380. Types of programs and/or data accessible from remote memory device 381 on remote computer 380 can include, but are not limited to, remote application programs 385 and remote program data 386.

Figure 4:
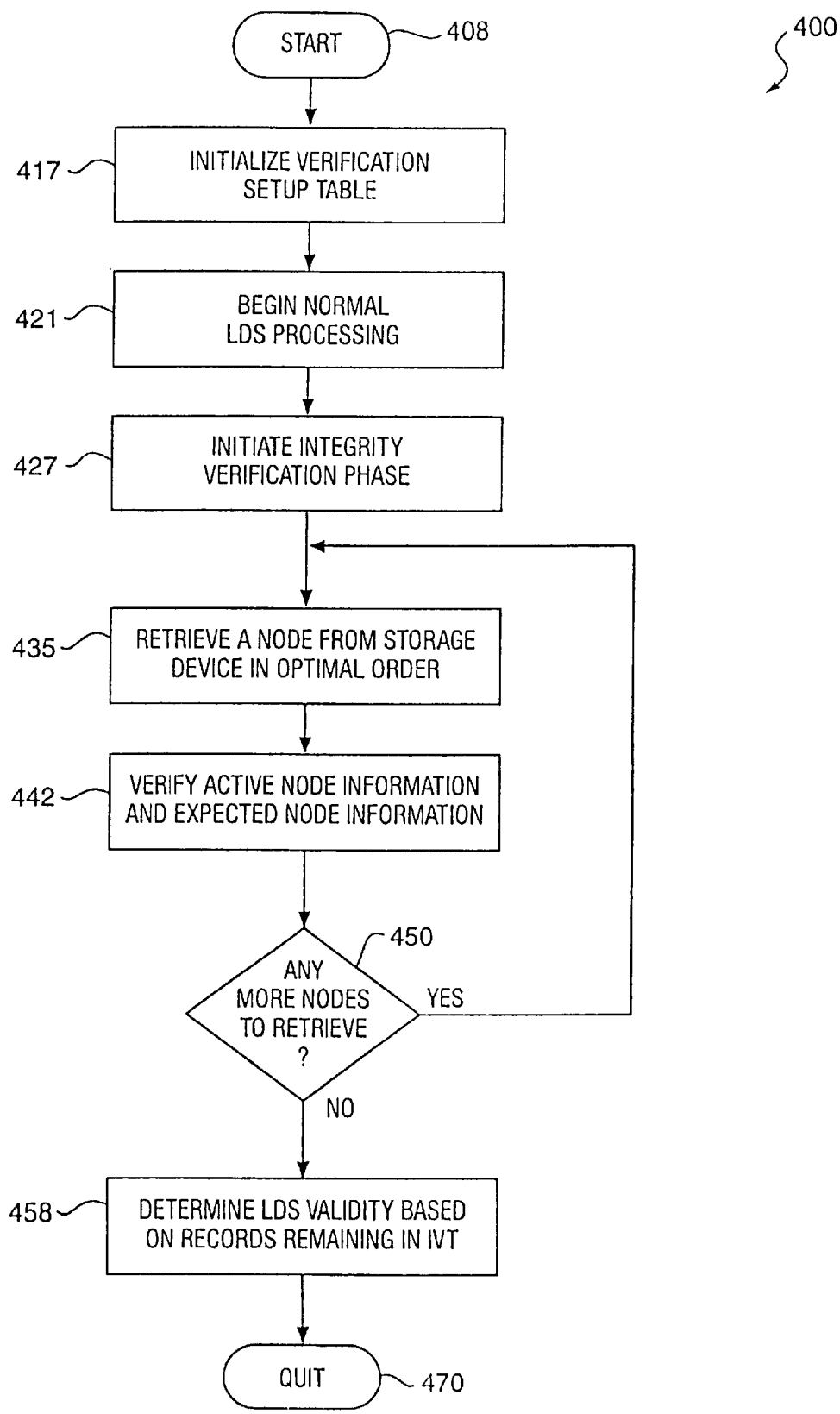
FIG. 4 illustrates an operational overview of the linked data structure verification system in flow diagram form.

Verification System Operational Overview—FIG. 4

FIG. 4 illustrates an overview of the operational steps 400 for the linked data structure verification system in flow diagram form. The operational steps 400 begin at step 408 and proceed to the verification setup phase that includes steps 417 and 421. At step 417, the verification setup table (VST) is generated and/or initialized for use prior to normal linked data structure (LDS) verification processing. The verification setup table can be maintained in volatile or non-volatile memory separate from the linked data structure itself. The verification setup table is presumed to exist at step 417. An example of a verification setup table is disclosed in the text accompanying FIG. 6.

Normal linked data structure processing begins at step 421 and includes adding, removing, updating, and manipulating nodes in a linked data structure pursuant to the ordinary operational directions of a controlling application, in addition to other program operations not involving linked data structures. Step 421 is considered part of the verification setup phase because a verification setup table is maintained during normal linked data structure processing for each linked data structure that is subject to integrity verification. The node information maintained in each record of a verification setup table can include, but is not limited to, a node name and a physical node address for an individual node. Details of the normal linked data structure processing portion of the verification setup phase is disclosed in the text accompanying FIGS. 5–6.

Note that maintaining the above mentioned node information in a verification setup table in real-time as nodes are added or removed from a structure is more reliable and efficient than traversing the structure to collect node information immediately prior to the integrity verification phase. One reason that maintaining the verification setup table in real-time is more reliable than gathering node information by traversal, is that a traditional node traversal relies on the very node pointers that have not yet been verified as being accurate. Thus, node information for certain nodes could be missing from the verification setup table altogether when the integrity verification phase begins. One reason maintaining the verification setup table in real-time is more efficient than gathering node information by an independent traversal, is that traversing and extracting node information for a very large data structure takes longer than updating the node information in the verification setup table as a node is being added or deleted from a data structure.

The integrity verification phase begins at step 427 in response to a user input command or any other stimulus, and ends at step 470. The integrity verification phase can also be initiated by any other automated or semi-automated means that satisfies user needs. Typically, the normal linked data structure processing of step 421 is halted prior to beginning the integrity verification phase, however, halting normal linked data structure processing is not mandatory. The advantage of halting linked data structure processing prior to the integrity verification phase, is that the structure being verified is not changing during the integrity verification process. Verifying the integrity of a live or non-static data structure means that nodes being added or deleted from the structure must be identified as they are added or deleted from the structure so that the integrity verification process can return to those nodes and/or their neighboring nodes to verify the relevant pointer data. In a worse case scenario, some portion or all of the data structure would need to be traversed to re-collect node information for a thorough integrity verification. One important aspect of the present invention is that the entries in a verification setup table are arranged in an order that facilitates optimal node retrieval performance by the memory device on which the linked data structure resides. The integrity verification phase operates on one or more linked data structure by retrieving individual nodes from among the combined set of nodes from a memory device in optimal memory device access order. As previously stated, the order that nodes are retrieved is defined by the order of entries in the verification setup table. Retrieving nodes in an optimal memory location order is dictated by the memory device configuration and other physical requirements that minimize the operational time required to execute the integrity verification phase. Note that optimal memory location order is dependent on the target memory device.

At step 435, an individual node is retrieved in optimal memory location order from the memory device on which it resides. At step 442, the actual node information in the retrieved node is examined to determine if any inconsistencies exist with respect to expected node information that is already known about the subject linked data structure. The expected node information exists in an integrity verification table (IVT) that is constructed during the integrity verification phase. Individual entries in an integrity verification table are called records and the information in an individual record may represent node information relating to more than one node. One purpose of the integrity verification table is to maintain a record of what is known to exist and what is expected to exist about a given linked data structure in as few records as possible. Details of the integrity verification phase operational steps are disclosed in the text accompanying FIG. 7.

If it is determined at decision step 450 upon review of the verification setup table contents that there are additional nodes in a given linked data structure to verify, then processing continues at step 435 as previously disclosed. Alternatively, if it is determined at decision step 450 upon review of the verification setup table contents that there are no additional nodes in a given linked data structure to verify, then processing continues at step 458.

At step 458, a final determination as to the validity of a given linked data structure is determined based on the contents of the record or records remaining in the integrity verification table once all nodes of a linked data structure are processed. Any final validity reporting is also generated at step 458. The integrity verification phase processing stops at step 470. However, normal linked data structure processing can resume at this point by returning to step 421.

Generally speaking, the valid or invalid result of an integrity verification is determined by the content of any record that remains in the integrity verification table at the end of verification processing depending on the type of structure being verified. For example, the meaning of any content in a remaining record can be different for a linked list data structure versus an index tree structure. More specifically, at the end of a valid integrity verification for a doubly linked list, the integrity verification table should contain only one record of a "forward pointer" type, where the identification field in the node matches the id of the linked data structure being verified, the pointer origin is the node name of the first node in the linked data structure, and the pointer destination is the node name of the last node in the linked data structure. At the end of a valid integrity verification for an index tree structure, the integrity verification table should contain only one record that represents a root node of the tree, where the identification field in the node matches the id of the linked data structure tree being verified, and the node name should be that of the root node of the tree.

Figure 5:
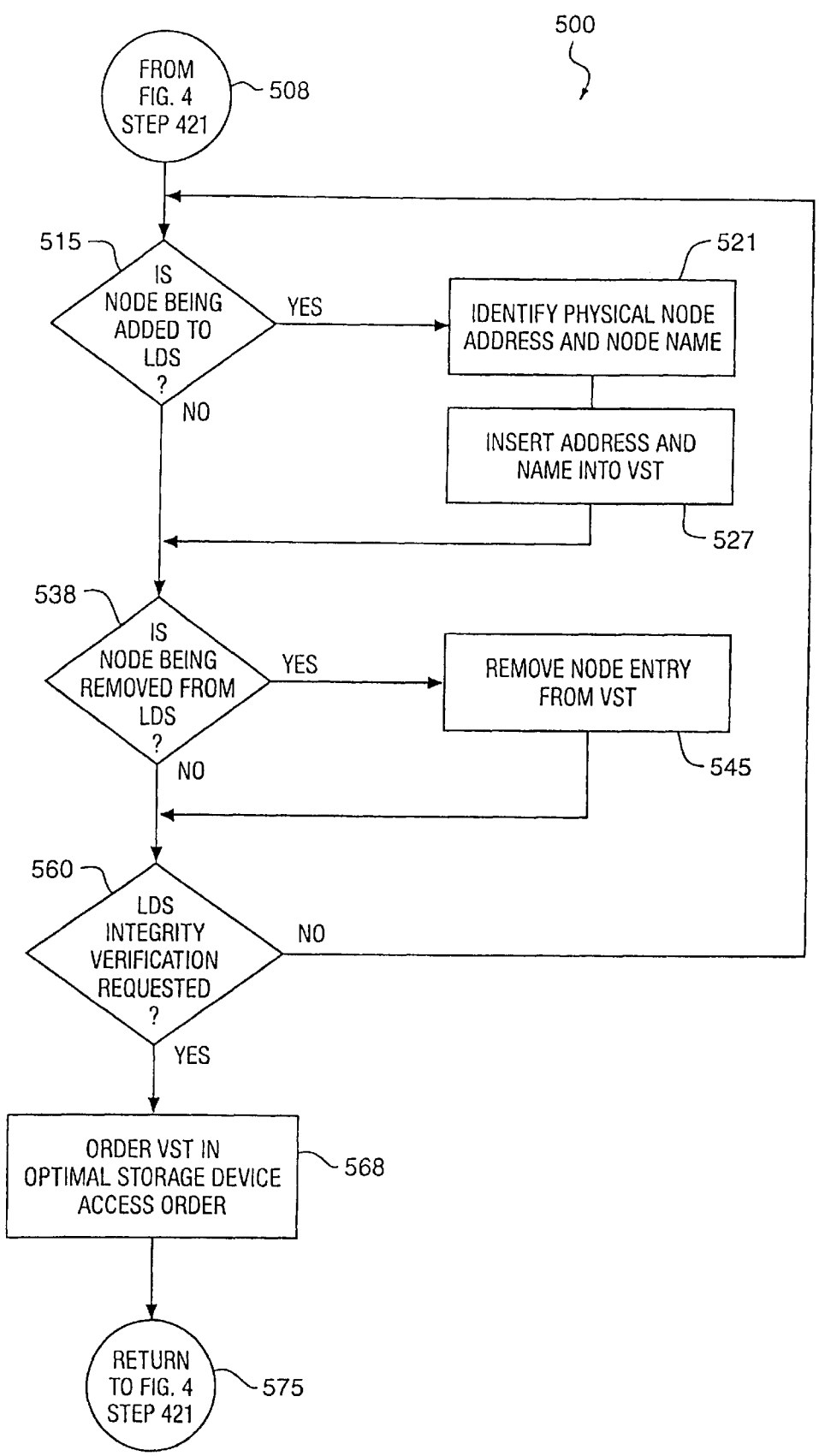
FIG. 5 illustrates the verification setup phase operational steps in flow diagram form.
Figure 6:
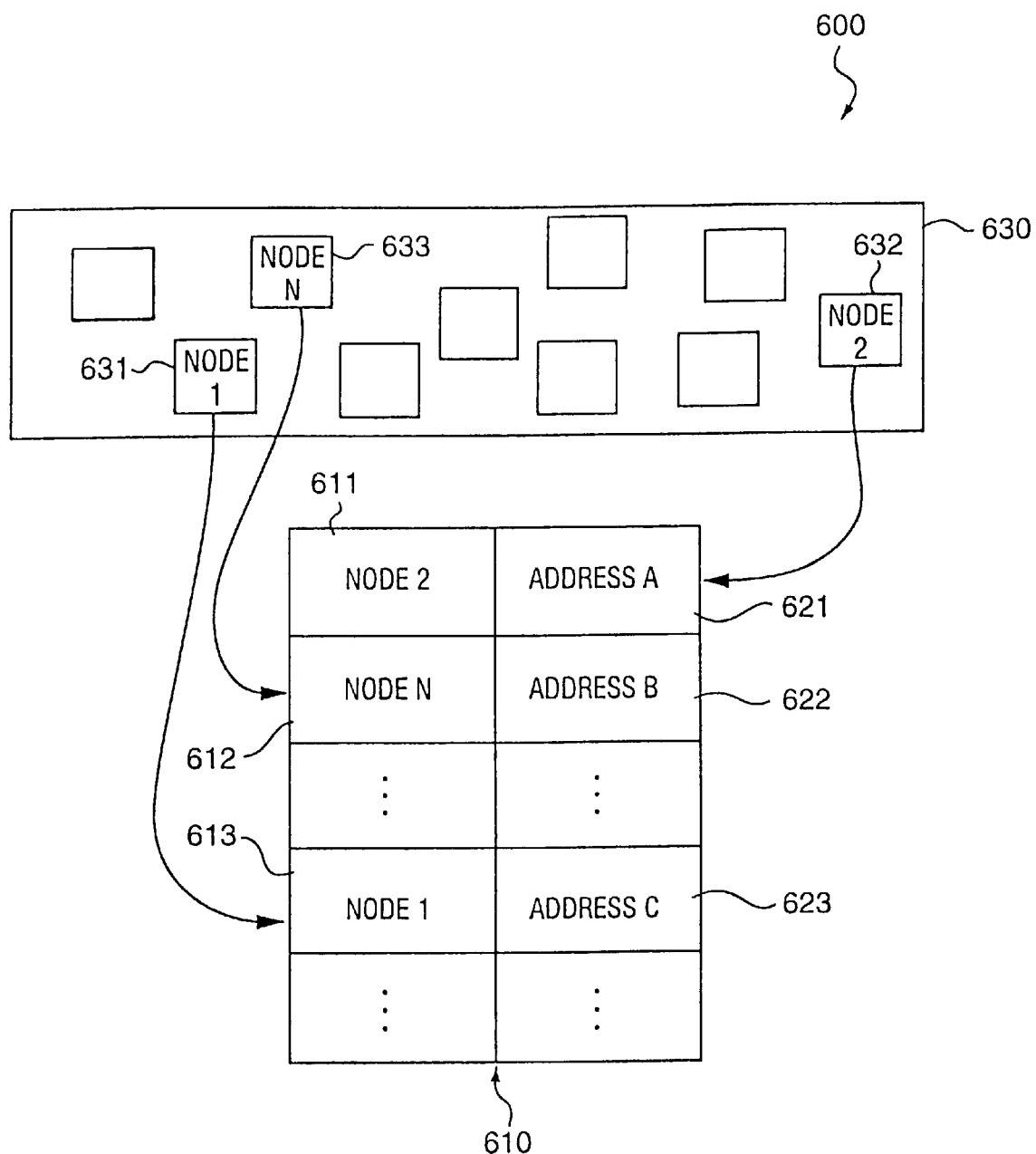
FIG. 6 illustrates an example of the verification setup phase for a magnetic disk memory device in block diagram form.

Verification Setup Phase Operational Steps—FIGS. 5–6

FIG. 5 illustrates operational steps 500 for the normal linked data structure processing portion of the verification setup phase in flow diagram form. The operational steps 500 begin at step 508 and are the details of step 421 from FIG. 4. One basic purpose of the verification setup phase is to generate an optimally ordered set of node information in a verification setup table for at least one linked data structure that is the subject of an integrity verification. Factors that determine an optimal ordering of verification setup table contents are dictated by the configuration and other physical requirements of the memory device on which the linked data structure resides.

Note that the verification setup phase can simultaneously maintain a separate verification setup table for each linked data structure that is the subject of verification testing. One reason a separate verification setup table might be maintained for each linked data structure is because the linked data structures reside on separate memory devices and the purpose of the verification setup table is to contain optimal memory device access order information that can be used to facilitate maximum memory device retrieval performance when individual nodes are being retrieved from the memory device.

Alternatively, the verification setup phase can maintain a single verification setup table for multiple linked data structures that are subject to verification testing provided that the multiple linked data structures all reside on the same memory device. One reason a single verification setup table might be maintained is because the integrity verification phase can simultaneously verify multiple linked data structures that reside on the same memory device. Key to the efficiency of the simultaneous verification of multiple linked data structures is that the nodes of the multiple linked data structures are organized in a single verification setup table in optimal memory device access order independent of the logical linked data structure to which any one node is associated. Thus, memory device access performance is maximized by accessing each node in the optimal memory device access order.

Note also that individual linked data structures can be identified in a verification setup table by a unique linked data structure identification number. One reason for including a unique linked data structure identification number is so that a node associated with a first linked data structure can be distinguished from a node associated with a second linked data structure when both nodes are being cataloged independent of their logical linked data structure context. Having clarified these points, additional processing by operation steps 500 continues at step 515 as disclosed below.

If it is determined at decision step 515 that a node is being added to a linked data structure that is the subject of verification testing, then processing continues at step 521. At step 521 the verification setup phase identifies the node name or label of the node being added to the linked data structure and the physical address of the node's location on the memory device that contains the subject linked data structure. Note that the node name or label and the node address can be one in the same. At step 527, the node name and the node address are inserted as an entry in a verification setup table. Additional node information can also be stored in the verification setup table as needed to uniquely identify a node and/or its precise memory device location for a given linked data structure. Processing continues at step 538. Alternatively, if it is determined at decision step 515 that a node is not being added to a linked data structure that is the subject of verification testing, then processing continues at step 538.

If it is determined at decision step 538 that a node is being removed from a linked data structure that is the subject of verification testing, then the entry for that node is removed from the verification setup table. If no entry exists in the verification setup table for a given node, then an error has occurred. Processing continues at step 560. Alternatively, if it is determined at decision step 538 that a node is not being removed from a linked data structure that is the subject of verification testing, then processing continues at step 560.

If it is determined at decision step 560 that no integrity verification is being requested for a linked data structure for which a verification setup table is being maintained, then processing continues at step 515 as previously disclosed. Alternatively, if it is determined at decision step 560 that an integrity verification is being requested for a linked data structure for which a verification setup table is being maintained, then processing continues at step 568.

At step 568, the entries in the verification setup table being maintained for a given linked data structure must be ordered according to the optimal memory device access order if the entries in the verification setup table are not already so ordered. One reason the entries of a verification setup table might already be optimally ordered by the time verification setup phase processing reaches step 568 is because the node information entries were inserted into and removed from the verification setup table at steps 527 and 545 respectively in a manner that maintained optimal ordering at all times. However, this type of on-the-fly ordering might itself require a linked data structure implementation for the verification setup "table" if optimal performance is desirable in the overall verification setup phase implementation. One reason the entries of a verification setup table might not be optimally ordered by the time verification setup phase processing reaches step 568 is because the entries were inserted into and removed from the verification setup table at steps 527 and 545 respectively in the order of occurrence during normal linked data structure processing. In the latter case, the verification setup table need only be optimally ordered once in a manner that is most efficient for the specific verification setup table implementation. Whether the verification setup table is maintained in optimal order during verification setup phase processing or whether the verification setup table is order once at the completion of verification setup phase processing is an implementation specific performance preference. One alternative implementation of the present invention is to optimally order the verification setup table once at the end of verification setup phase processing.

Verification setup phase processing is complete at step 575 where processing returns to step 421 of FIG. 4.

FIG. 6 is a verification setup phase illustration 600 in block diagram. One purpose of the verification setup phase illustration 600 is to emphasize the advantages of arranging the node entries of a verification setup table in an optimal memory device access order that facilitates maximum memory device retrieval performance during the integrity verification phase. Factors that determine an optimal ordering of node information in a verification setup table vary from one memory device type to the next and must be accounted for in a specific verification setup phase implementation. One reason for identifying the physical location of a node on a memory device by a technique other than the ordinary logical node-by-node traversal of a linked data structure, is to eliminate reliance on the very node pointers whose integrity is being verified.

The verification setup phase illustration 600 includes an example of a memory device 630 also known as a storage device, and a verification setup table 610. The memory device 630 is a non-volatile memory on which a persistent copy of a linked data structure resides. A magnetic disk device is one common example of a nonvolatile memory used to store a persistent copy of a linked data structure. The nodes of a linked data structure are located throughout the memory device 630 in a manner that does not reflect the logical order of the linked data structure. For this reason, a first node may physically be a significant distance from a second node on the same memory device even though the first node and the second node are logical neighbors as far as the logical view of a linked data structure is concerned. The verification setup table 610 can be any data structure type that lends itself to ordered storage or to efficient sorting such as a table or a linked list.

For purpose of example, consider node 631 as the first node or Node-1 of a linked list where the node is physically located at cylinder 15, head 5, sector 1 of a magnetic disk device. Similarly, node 632 is identified as the second node or Node-2 of the same linked list and is physically located at cylinder 1, head 1, sector 1 of the magnetic disk, and node 633 is the n-th node or Node-n of the same linked list and is physically located at cylinder 14, head 1, sector 1. If the optimal retrieval order of nodes from memory device 630 is in ascending order of cylinder, head, and sector, then the optimal node retrieval order would be Node-2 632 first, Node-n 633 second, and then Node-1 631 third. Alternatively, retrieving the same three nodes in logical linked data structure order would cause the memory device 630 to retrieve the first node 631 first from cylinder 15, then move the read/write head armature to cylinder 1 to retrieve the second node 632, and then back again to cylinder 14 to retrieve the third node 633. Thus, the logical linked data structure order of node retrieval is extremely inefficient due to the disk-wide seeks necessary to locate and retrieve individual nodes, whereas retrieving nodes in optimal memory device access order requires a minimal amount of armature movement for the best possible retrieval performance. Verification setup table 610 illustrates node information entries 611–613 in the optimal memory device access order by memory device location 621–623 for each node. Other memory device examples exist that have different memory properties, yet are within the scope of the present invention.

Figure 7:
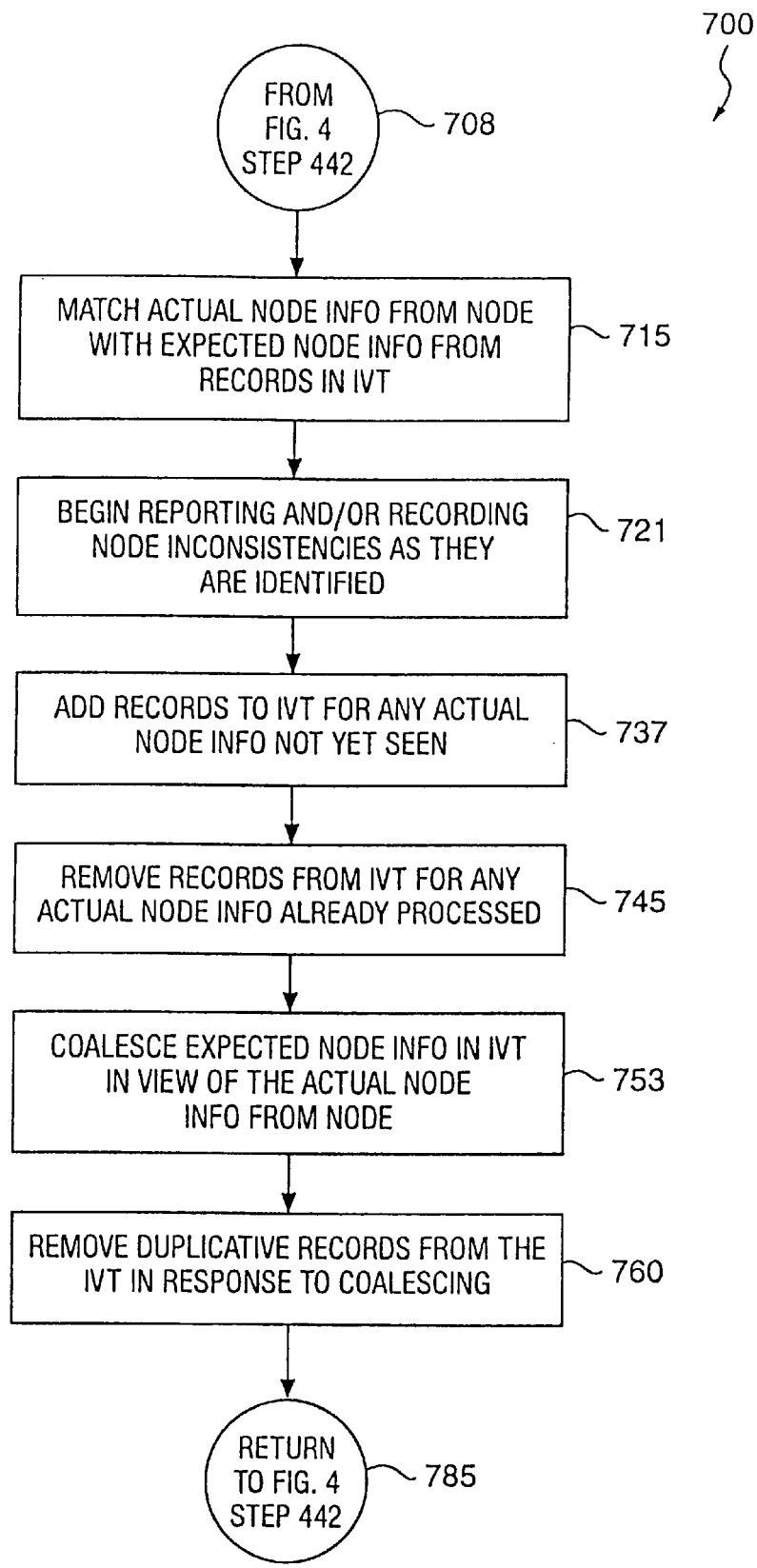
FIG. 7 illustrates the integrity verification phase operational steps in flow diagram form.

Integrity Verification Phase Operational Steps—FIG. 7

FIG. 7 illustrates the operational steps 700 for the node information evaluation portion of the integrity verification phase in flow diagram form. The operational steps 700 begin at step 708 and are the details of step 442 from FIG. 4.

Note that the details of any one of the operational steps 700 may be more or less complex depending on the specific type of linked data structure being verified. For example, a doubly linked list type data structure is a simpler structural construction than an index tree. It follows then that an integrity verification phase implementation for a doubly linked list is less complex than for an index tree. Having clarified these points, additional processing by operation steps 700 continues at step 715 as disclosed below.

At step 715, the actual node information from a presently retrieved node is matched or compared with what is already known about the linked data structure that is the subject of the integrity verification. The information already known about the linked data structure is called the expected node information. That is, information from previously evaluated nodes contains information about neighboring nodes that have not yet been seen so that when a yet unseen neighboring node is retrieved for evaluation, certain expectations already exist about the information that should exist in the actual node itself. The expected node information is maintained in an integrity verification table (IVT).

An integrity verification table is preferably a key-addressable or indexed store such as a hash table or relational database. The purpose for keys or indexing in the integrity verification table is to facilitate rapid lookups of information about one or more nodes that share certain stated characteristics. The node information for a given node is an entry in the integrity verification table called a record. At most, there exists one record in an integrity verification table for every node that has been seen. However, the longer the integrity verification phase processing continues, the greater the likelihood that all information in a record has already been verified, in which case the record will be deleted at step 745.

Step 721 notes the beginning of generating results of the node information evaluation process. Note that results are continuously generated throughout the integrity verification process. A report that is generated contains relevant information about any inconsistency identified between the actual node information of a retrieved node and the known information that is expected in a retrieved node. The report may be as simple as a single error printed or stored in an error log for later analysis and/or correction by a user that has requested the integrity verification. The results generated from the integrity verification process can be reported at any time. For example, the results can be reported in real-time as the results become available during processing, or the results can be queued for subsequent reporting after the verification process is complete.

At step 737, a record is added to the integrity verification table for any actual node information that has not yet been seen by the integrity verification phase processing. The purpose of adding this information to the integrity verification table is to make sure that when related nodes are processed, the information that is expected to exist in the present actual node can be verified as correct in a sorted order.

At step 745, records are removed that contain actual node information that has already been processed or that is duplicative of node information already represented in the integrity verification table. The purpose of removing these types of records is to minimize the amount of memory required by the integrity verification table as well as the volume of information that exists in the integrity verification table at any one time.

At step 753, the expected node information in the integrity verification table is coalesced in view of the recently added actual node information from step 737 and/or the removed node information from step 745. Any unnecessary and/or duplicative node information remaining in the integrity verification table after the coalescing of step 753 can be removed from the table at step 760. The purpose of coalescing node information in the integrity verification table is to minimize the volume of expected node information by excising information that is no longer necessary or that is duplicative.

For example, consider the situation where the expected node information in an integrity verification table includes information about a first node in a doubly linked list that has a forward pointer to a second node, in addition to information about a third node that has a backward pointer to the same second node. The expected node information about the second node is that its forward pointer should point to the third node and its backward pointer should point to the first node. Once the actual node information for the second node is known and verified according to expectations, the actual node information for the second node is no longer needed and can be removed. Further, the individual records of node information relating to the first node and the third node can be coalesced into a single record containing expected backward pointer information and forward pointer information to a zeroth node and a fourth node respectively. The single coalesced record then compactly represents verified node information relating to three actual nodes of the linked data structure.

The operational steps 700 are complete at step 785 and processing returns to step 442 of FIG. 4.

Secondary Index Verification Operational Steps

The operational steps for verifying the integrity of a secondary index type linked data structure are fundamentally the same as are disclosed in the text accompanying FIGS. 4–5 and 7. However, just as the implementation of a heaped linked data structure requires different considerations from the implementation of an indexed linked data structure, a secondary index linked data structure requires different considerations from an indexed linked data structure. One key to the linked data structure verification system operational steps 400 is that the special considerations required from one linked data structure implementation to the next can be accommodated within the scope of the verification setup phase operational steps 500 and the integrity verification phase operational steps 700 as previously disclosed. Special considerations relating to a secondary index type lined data structure implementation are disclosed below.

Figure 1:
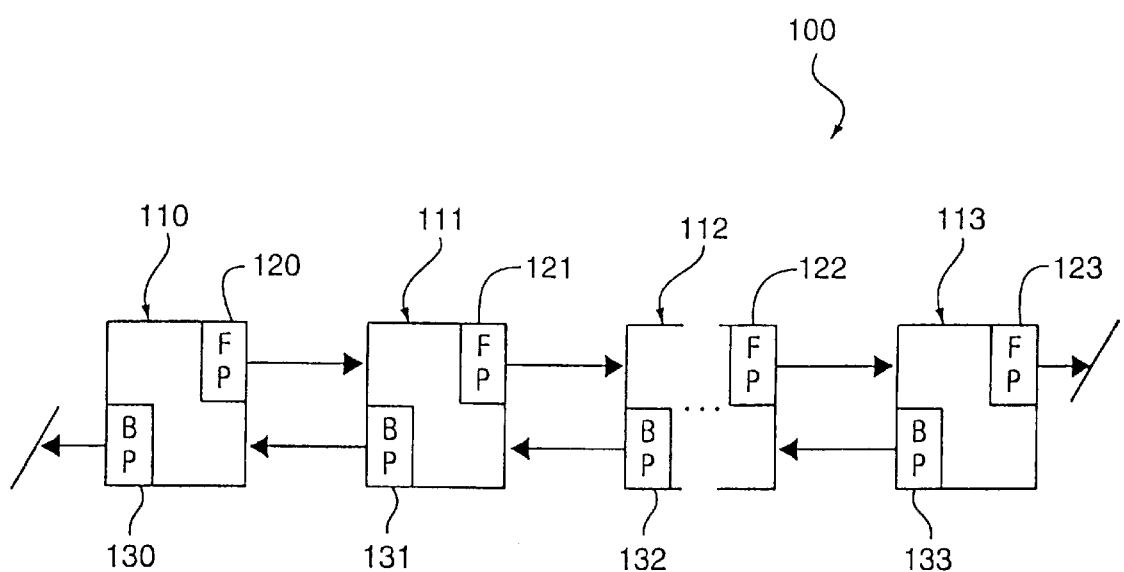
FIG. 1 illustrates an example of a doubly linked list type linked data structure in block diagram form.
Figure 2:
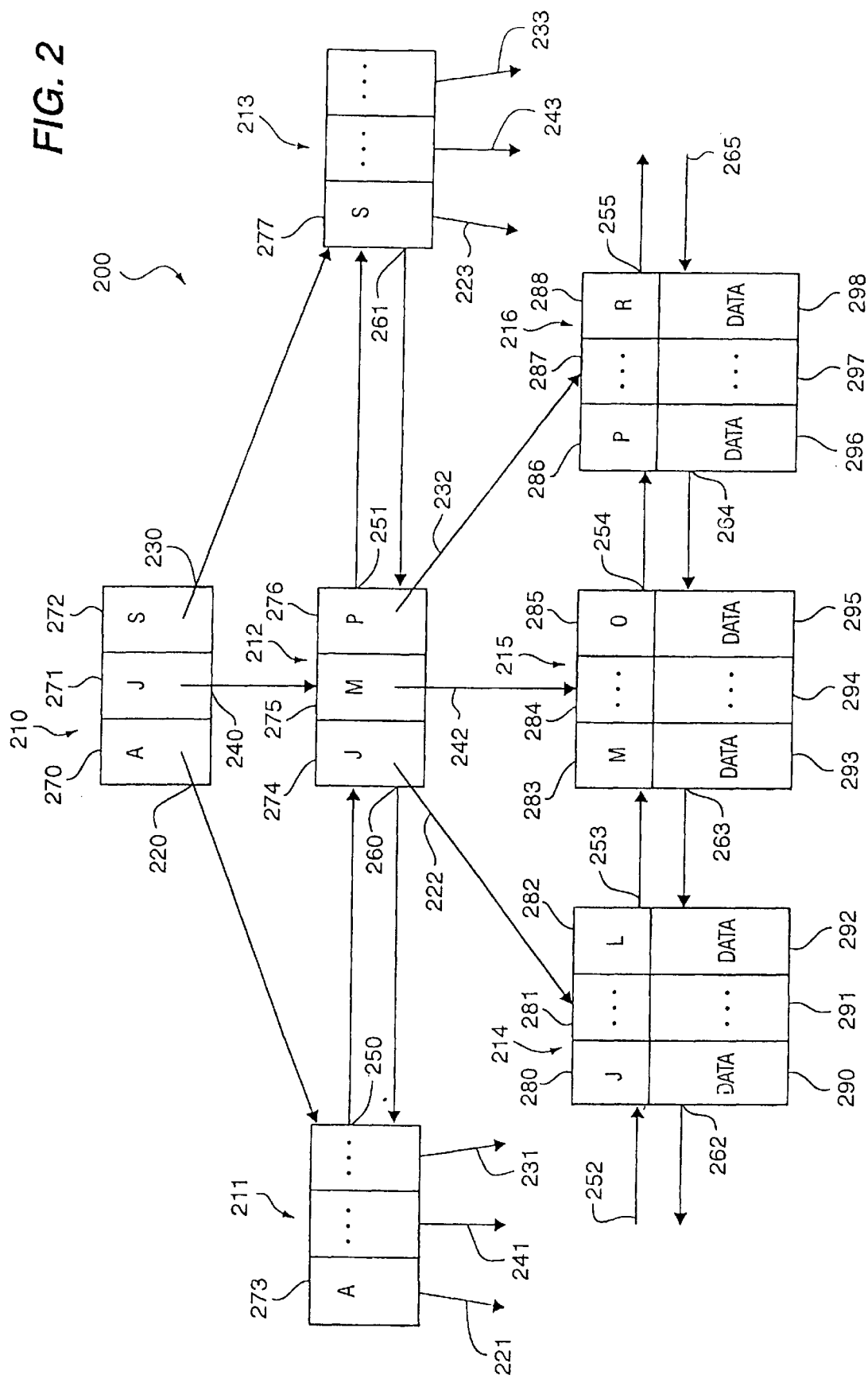
FIG. 2 illustrates an example of an index tree type linked data structure in block diagram form.

A secondary index type linked data structure is an index tree construct where instead of the leaf nodes containing data, the leaf nodes contain pointers to the location of the data in a separate data structure. For this reason, the verification setup phase and integrity verification phase for a secondary index linked data structure are substantially similar to the index tree as previously disclosed. However, pointers among the two or more data structures must be verified simultaneously. Note also that there may be more than one index tree structure, for example, that each points to the same data in a separate data structure. In effect, a typical index tree structure as disclosed in FIG. 2 contains a two dimensional set of pointers among sibling and peer nodes, while a secondary index linked data structure contains the typical index tree structure pointers in addition to a set of third dimension pointers that reference nodes of an independent data structure.

The operational steps 500 of a verification setup phase for a secondary indexed data structure require that a verification setup table be maintained for node information entries relating to the basic index tree node information in addition to the secondary index pointer information as previously disclosed. The entries in the verification setup table are optimally ordered as disclosed in the text accompanying FIG. 5.

The operational steps 700 of an integrity verification phase for a secondary indexed data structure can proceed as disclosed in the text accompanying FIG. 7. Alternatively, operational steps 700 can be optimized with respect to the third dimensional pointer types that are the references between the base indexed structure and the secondary indexed structure.

Integrity verification phase differences for a secondary index linked data structure appear at step 427 of FIG. 4. At step 427, a secondary index verification table can be initialized in addition to the integrity verification table as previously disclosed. The secondary index verification table is a bit array that ideally has a bit position for each leaf node in a given secondary index structure. Thus, each bit in the secondary index verification table would correspond to a record in the integrity verification table. Note that the size of the bit array is dependent on the system resources that are available and the user's tolerance to the tradeoff between accuracy and efficiency of the verification system. The secondary index verification table is initialized to either all zeros or all ones at step 427 of FIG. 4. For purposes of the present discussion, assume that the secondary index verification table is initialized to all zeros.

At step 442 of FIG. 4, in addition to performing the integrity verification phase processing as disclosed in the operational steps 700 of FIG. 7, the secondary index verification table is used to verify the secondary index structure in the following manner. As each leaf node or data page is examined in order of its location on the memory device, the selected keys of the integrity verification indexing information are hashed into a fixed size value. The fixed size value is sufficient in size so that it can be used to address each bit in the secondary index verification table. Addressing each bit in the secondary index verification table is also referred to as indexing into the secondary index verification table. The bit located a given index position in the secondary index verification table is toggled to its binary opposite from 0-to-1 or 1-to-0, depending on the bits value at the time the indexing occurs. The type of hashing technique used is an implementation choice.

When all nodes have been processed and at the time the validity of the linked data structure is being determined in view of the contents of the integrity verification table at step 458 of FIG. 4, the secondary index verification table is also evaluated in the following manner. If all bits in the secondary index verification table are equal to the initialization value from step 427, then the integrity of the secondary index linked data structure is considered valid or verified. The probability of finding validity or a positive verification result is dependent on the number of leaf records in the secondary index and the number of bits in the secondary index verification table. However, if the initialization value from step 427 was zero and if any one bit in the secondary index verification table is not zero at the completion of the verification process, then the integrity of the secondary index linked data structure is considered invalid or not verifiable and the position of the non-zero bits indicate which node or nodes contain the invalid information.

The reason all bits in the secondary index verification table should match the initialization value of step 427 is because each bit should have been toggled twice, once for a given leaf node in the base index structure and once for a corresponding leaf node in the secondary index structure. Stated more generally, each bit in the secondary index verification table should be toggled an even number of times regardless of the number of secondary index structures that exist because pointers between such structures are in pairs, one pointing to a node in the indexed structure and one pointing away from a node in the data structure.

If errors are detected then a second pass of the indexed structure can be run to generate detailed error messages. When the records of the indexed structure are processed on a second pass, the hash value that is generated is checked against the corresponding secondary verification table value although the secondary verification table is not modified. In the event a bit in the secondary verification table is set in error, then the secondary index structure is searched for the key value for a data page, or the data record for an index page, using the normal index and/or data access code for the key or address respectively. If the resulting data record does not match the index record, then an error message is generated to report the fact.

Verification Process Alternatives

A multiple pass linked data structure verification process can be beneficial for linked data structures that are larger than are manageable for processing in a local memory. The amount of local memory that is required for verification processing can be determined from the number of nodes in the data structure and the key size. If the estimate of the necessary local memory size based on heuristics suggests that verification processing will require more memory than is available, then the index is broken into n sections that are substantially equal in size based on the key value using the upper levels of the data structure. Each of the n sections is checked in a separate pass over the index. Unconsolidated nodes at the boundaries are left in place for processing on a subsequent pass. Verification of links between pages can be segmented in a similar manner using ranges of page addresses as the segmentation criteria.

Linked data structure verification can also use the group aggregate function of a Structured Query Language (SQL) type query processor to validate large data structures. Using the node ID as an aggregate key, all the information for a node can be collected and aggregated using custom aggregate functions. At the end of the aggregation phase any nodes with conflicting or incomplete information can be printed using a custom SQL function to interpret the node state and/or generate error messages as appropriate.

Conclusion

The linked data structure verification system of the present invention verifies the integrity of a linked data structure by way of a verfication setup phase and an integrity verification phase. The verification setup phase operates during normal linked data structure processing to maintain a real-time record of the node name and the actual memory device location of each node associated with a given linked data structure. The integrity verification phase traverses each node of one or more linked data structures in optimal memory device access order to verify node information for each node. The node information is collected in an integrity verification table for only as long as it is needed prior to being excised during a coalescing step in the integrity verification phase.

Although specific embodiments are disclosed herein, it is expected that persons skilled in the art can and will make, use, and/or sell alternative linked structure verification systems that are within the scope of the following claims either literally or under the Doctrine of Equivalents.

What is claimed is:

1. A machine readable memory tangibly embodying instructions executable by a computer to perform a method for verifying integrity of a linked data structure that resides on a memory device, said linked data structure having a plurality of nodes and each of said plurality of nodes containing actual node information, said method comprising:

generating a first table having a node address entry for a physical memory device location of each of said plurality of nodes in said linked data structure;

retrieving actual node information for each of said plurality of nodes seriatim from said memory device in a retrieval order that facilitates optimal memory device retrieval performance in view of contents of said first table;

maintaining a second table of a minimum store of expected node information that is indicative of at least one of said plurality of nodes in said linked data structure; and verifying said actual node information from a retrieved one of said plurality of nodes against said expected node information in said second table.

2. A method according to claim 1 wherein said step of generating said first table includes:

adding said node address entry to said first table in real time for each one of said plurality of nodes added to said linked data structure; and removing said node address entry from said first table in real time for each one of said plurality of nodes removed from said linked data structure.

3. A method according to claim 2 wherein said step of adding includes:

inserting each said node address entry to said first table in an optimal memory device access order dictated by characteristics of said memory device.

4. A method according to claim 1 wherein said step of retrieving includes:

ordering each said node address entry of said first table in an optimal memory device access order dictated by requirements of said memory device at one time prior to retrieving any node for verification testing.

5. A method according to claim 1 wherein said step of maintaining said second table includes:

coalescing said actual node information from a retrieved one of said plurality of nodes into expected node information in said second table for each of said plurality of nodes retrieved from said memory device; and removing said actual node information from said second table that is duplicative of said expected node information in said second table, in response to said step of coalescing.

6. A method according to claim 1 wherein said step of verifying includes:

distinguishing expected node information from said actual node information;

comparing said actual node information from a retrieved one of said plurality of nodes with expected node information in said second table;

reporting inconsistencies that are identified between said actual node information and said expected node information.

7. A method for simultaneously verifying integrity of at least one linked data structure comprising:

cataloging node information for a plurality of nodes associated with each of said least one linked data structure on a memory device;

retrieving each of said plurality of nodes seriatim from said memory device in an optimal memory device access order that facilitates optimal node retrieval performance independent of any logical linked data structure traversal and independent of any position of said plurality of nodes within any of said at least one linked data structure; and verifying node pointer integrity for each of said plurality of nodes based on a minimal store of node information knowledge.

8. A method according to claim 7 wherein said step of retrieving includes:

generating a node address table having a node address entry for each of said plurality of nodes in said at least one linked data structure; and ordering said node address table in said optimal memory device access order prior to retrieving any one of said plurality of nodes.

9. A method according to claim 7 wherein said step of verifying includes:

comparing actual node information from a retrieved one of said plurality of nodes against expected node information already known about said plurality of nodes in any one of said at least one linked data structure;

reporting any inconsistency between said actual node information and said expected node information in response to said comparing step;

updating said expected node information with valid parts of said actual node information; and removing any parts of said actual node information that are duplicative of said expected node information in response to said updating step.

10. A method according to claim 7 including:

generating at least one error message on a subsequent pass through said at least one linked data structure in response to said step of verifying.

11. A method according to claim 7 including:

identifying large ones of said at least one linked data structure that exceed an available amount of local memory available to implement said step of verifying; and segmenting large ones of said at least one linked data structure into a plurality of segments that are each subject to said step of verifying.

12. A method according to claim 7 including:

identifying large ones of said at least one linked data structure that exceed an available amount of local memory available to implement said step of verifying; and implementing a group aggregate function by way of a node identifier as an aggregate key to verify said large ones of said at least one linked data structure.

13. A linked data structure verification system in a computing device, said computing device having access to a memory device on which at least one linked data structure resides, each of said at least one linked data structure having a membership of a plurality of nodes, said system comprising:

a verification setup phase operable in real time during normal linked data structure processing, said verification setup phase includes:

means for generating a node address table having a node address entry for each of said plurality of nodes in said at least one linked data structure; and means for ordering said node address table in a physical memory location retrieval order; and an integrity verification phase operable upon completion of said verification setup phase, said integrity verification phase includes:

means for retrieving each of said plurality of nodes seriatim from said memory device in said physical memory location retrieval order that facilitates optimal memory device retrieval performance;

means for comparing actual node information from a retrieved one of said plurality of nodes against expected node information already known about said plurality of nodes in any one of said at least one linked data structure;

means for reporting any inconsistency between said actual node information and said expected node information in response to said comparing means;

means for updating said expected node information with valid parts of said actual node information; and means for removing any parts of said actual node information that are duplicative of said expected node information in response to said updating means.

14. A system according to claim 13 wherein said integrity verification phase includes:

means for initializing a secondary index verification table of bits to a common bit value;

means for hashing selected keys of node information into a hash value for each node retrieved from said memory device;

means for indexing into said secondary index verification table based on said hash value to toggle a corresponding bit in said secondary index verification table; and means for verifying validity of node information for each of said plurality of nodes in view of said secondary index verification table contents.

15. A linked data structure verification system comprising:

means for cataloging node information during normal linked data structure processing for each of a plurality nodes associated with at least one linked data structure on a memory device;

means for retrieving actual node information for each of said plurality of nodes seriatim from said memory device in an optimal memory device access order that facilitates optimal node information retrieval performance independent of any logical node ordering in any of said at least one linked data structure;

means for verifying said actual node information against a minimized store of expected node information related to any one of said plurality of nodes from any one of said at least one linked data structure;

means for hashing at least one component of node information corresponding to a secondary index linked data structure into a secondary index hash table to verify any existing secondary index linked data structure node information.

16. A system according to claim 15 wherein said means for cataloging includes:

means for generating a verification setup table having a node information entry for each of said plurality of nodes in said at least one linked data structure; and means for ordering said verification setup table in said optimal memory device access order prior to an integrity verification phase.

17. A system according to claim 15 wherein said means for verifying includes:

means for generating said expected node information from said actual node information;

means for comparing said actual node information from a retrieved one of said plurality of nodes against said expected node information already known about said plurality of nodes related to any one of said at least one linked data structure;

means for reporting any inconsistency between said actual node information and said expected node information in response to said comparing step;

means for coalescing said expected node information with valid parts of said actual node information into a minimal store of said expected node information; and means for removing any parts of said actual node information that are duplicative of said expected node information in response to said means for coalescing.

18. A system according to claim 15 wherein said means for hashing includes:

means for initializing a secondary index verification table of bits to a common bit initialization value;

means for hashing said at least one component of node information into a hash value for each node retrieved from said memory device;

means for indexing into said secondary index verification table based on said hash value to toggle a corresponding bit in said secondary index verification table; and means for verifying validity of secondary index linked data structure node information for each of said plurality of nodes in view of contents of said secondary index verification table.

19. A system according to claim 18 wherein said means for verifying includes:

means for recording an error for each bit in said secondary index verification table that does not match said common bit initialization value; and means for reporting each said error that is recorded from said means for recording.

* * * * *